United States Patent [19]
Mizuta et al.

[11] Patent Number: 6,012,350
[45] Date of Patent: Jan. 11, 2000

[54] INTERNAL GEAR

[75] Inventors: Muneo Mizuta; Yasushi Yabe, both of Fuji, Japan

[73] Assignee: Jatco Corporation, Fuji, Japan

[21] Appl. No.: 09/055,312

[22] Filed: Apr. 6, 1998

[30] Foreign Application Priority Data

| Apr. 8, 1997 | [JP] | Japan | 9-089651 |
| Apr. 28, 1997 | [JP] | Japan | 9-111271 |
| May 30, 1997 | [JP] | Japan | 9-142379 |

[51] Int. Cl.$^7$ .............. F16H 55/06; F16H 3/44; B22F 7/00
[52] U.S. Cl. ............. 74/434; 29/893.34; 29/893.37; 419/5; 475/331; 475/344; 475/901
[58] Field of Search ............ 29/893.34, 893.37; 74/434; 475/331, 344, 901; 419/5

[56] References Cited

U.S. PATENT DOCUMENTS

| 2,561,579 | 7/1951 | Lenel | 29/893.37 |
| 2,704,465 | 3/1955 | Haller | 74/434 |
| 3,752,003 | 8/1973 | Dunn et al. | 74/434 |
| 3,762,236 | 10/1973 | Dunn et al. | 74/434 |
| 3,842,646 | 10/1974 | Kuhn | 29/893.37 X |
| 4,885,831 | 12/1989 | Fett | 29/893.35 X |
| 5,195,389 | 3/1993 | Isozumi | 74/7 E |
| 5,307,702 | 5/1994 | Spellman et al. | 74/7 E |
| 5,356,721 | 10/1994 | Knoess | 419/5 X |
| 5,674,148 | 10/1997 | Bouteille | 475/331 X |

*Primary Examiner*—Allan D. Herrmann
*Attorney, Agent, or Firm*—Foley & Lardner

[57] ABSTRACT

The internal gear is a bottomed cylindrical component, which has the boss portion fitted over the outer circumferential surface of the shaft, the disk-shaped flange portion extending radially outwardly from the boss portion, and the cylindrical gear body having a tooth portion in its inner circumferential surface and connecting integrally to the outer circumferential part of the flange portion. The flange portion is virtually conical on its outer side surface and tapered from the outer diameter side toward the inner diameter side, i.e., from the gear body toward the boss portion. This construction is thicker at the boss portion side than at the gear body side. Further, the density of the flange portion is almost inversely proportional to the thickness and is lower at the boss portion side than at the gear body side. The cylindrical gear body has a density distribution such that the central part of the gear body is lower in density than the end portions in a tooth trace direction of the teeth portions.

13 Claims, 14 Drawing Sheets

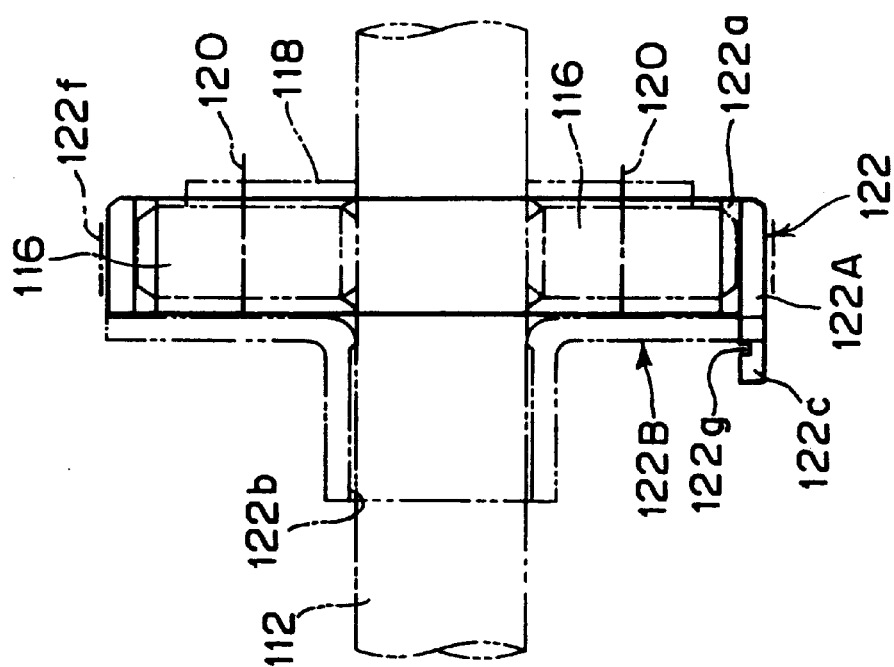
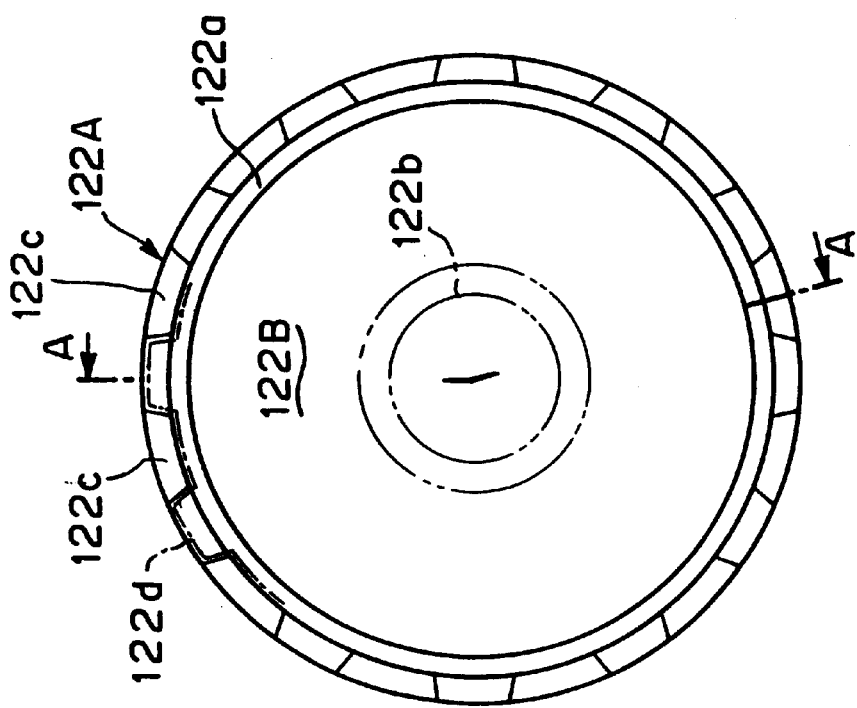
FIG. 8B
FIG. 8A 6,012,350

1

INTERNAL GEAR

This application is based on Patent Application No. 089,651/1997 filed Apr. 8, 1997, No. 111,271/1997 filed Apr. 28, 1997, and No. 142,379/1997 filed May 30, 1997 in Japan, the contents of which are incorporated hereinto by reference.

BACKGROUND OF THE INVENTION

1. Field of the Invention

The present invention relates to a ring gear or an internal gear that meshes with pinions of a planetary gear incorporated in an automatic transmission and also to a method of forming the internal gear.

2. Description of the Related Art

Internal gear 50 of the planetary gear incorporated in a transmission generally has a structure shown in FIG. 4. It is a gear component shaped like a bottomed cylinder whose cylindrical portion 51 comprises a gear body, the inner circumferential surface of which is formed with a plurality of teeth 51a in mesh with a pinion 54 rotatably supported on a pinion shaft 56. A bottom portion (flange portion) 52 of the internal gear 50 is shaped like a disk with uniform density and thickness and with an opening formed at the center on the inner diameter side to pass a shaft 55. The inner diameter part of the bottom portion 52 is integrally and coaxially provided with a boss portion 53. The internal gear 50 of such a construction is incorporated in the transmission by mounting the boss portion 53 on the outer circumferential surface of the shaft 55.

When the transmission operates driving the planetary gear, the gear body 51 of the internal gear 50 is subjected to vibrations resulting from errors of meshing with the pinion 54 during transmission of force. Because the boss portion 53 is fixed to the shaft 55, the internal gear 50 vibrates at the bottom portion (flange portion) 52 during rotation. With the conventional internal gear 50, however, because the bottom portion 52 has uniform density in the radial direction, the vibrations entering the gear body 51 are not so much attenuated even when they are transmitted to the bottom portion 52.

Where the internal gear is an integrally formed component by sintering, a multistage forming method that uses a plurality of divided molds is used to press and form it into the above-mentioned shape for the purpose of improving yield.

With the internal gear of the above conventional shape, however, strict control must be performed in the positions of the molds to ensure that the inner side surface of the flange portion and the inner end face of the boss portion are flush, i.e., a lower mold surface for forming the flange portion and a lower mold surface for forming the boss portion are flat and flush. It is also necessary to precisely control the density of powder to be compressed at various portions. The conventional shape of the internal gear, as described above, has a drawback of making the compression molding control complex.

Because the position control and the density control need to be performed simultaneously and strictly, any degradation of control precision, if it occurs with the conventional shape of the internal gear, may cause a sharp change in density at a joint between the split molds, i.e., the flange portion and the boss portion. This sharp density change will result in cracks in the joint, leading to a deteriorated resistance against torsional torque.

2

Further, the self-adjustment for smooth engagement between the internal gear and the pinion during the initial stage of operation is known to depend on the surface hardness of the internal gear as well as the pinion. To improve the initial self-adjustment for smooth engagement it has been proposed to set the surface hardness of the internal gear lower than that of the pinion.

When the error of parallelism between the rotating axes of the pinion and the internal gear exceeds an allowable range, which is caused by a clearance between the inner circumferential surface of the pinion and the outer circumferential surface of the pinion shaft and the resulting inclination between them, only a part of one of paired tooth surfaces of the pinion, which is formed as a helical gear, engages a corresponding tooth of the internal gear at a contact point. Hence, there is a possibility of a pitting occurring near both ends in the tooth trace direction of the pinion or of a flaking occurring on the outer circumferential surface of the pinion shaft. A possible countermeasure for this problem may involve enhancing the precision with which the pinion is assembled to the internal gear to reduce variations in parallelism. This method, however, increases the machining cost and there is a certain limit on the extent to which the parallelism variations can be reduced.

SUMMARY OF THE INVENTION

It is an object of this invention to provide an internal gear capable of minimizing vibrations produced during the operation of the planetary gear.

It is another object of this invention to provide a sintered internal gear with an improved shape which can reduce complexity in the control of molds while at the same time minimizing the occurrence of sharp changes in density.

It is still another object of this invention to provide an internal gear in mesh with a pinion in a planetary gear, which can prevent the occurrence of a pitting on the tooth surface of the pinion, and also a method of forming such an internal gear.

In a first aspect of the present invention, there is provided an internal gear comprising:

a boss portion to be mounted coaxially on an outer circumferential surface of a shaft;

a disk-shaped flange portion extending radially outwardly from the boss portion; and a cylindrical gear body integrally connecting to an outer circumferential part of the flange portion and having teeth on an inner circumferential surface thereof adapted to be in mesh with a pinion;

wherein a part in a radial direction of the flange portion is lower in density than other parts.

In a second aspect of the present invention, there is provided an internal gear comprising:

a boss portion to be mounted coaxially on an outer circumferential surface of a shaft;

a disk-shaped flange portion extending radially outwardly from the boss portion; and a cylindrical gear body integrally connected to an outer circumferential part of the flange portion and having teeth on an inner circumferential surface thereof adapted to be in mesh with a pinion;

wherein all or a part in a radial direction of the flange portion has a thickness thereof which progressively increases from an outer diameter side toward an inner diameter side and has a density in the radial direction almost inversely proportional to the thickness.

Here, a part of the internal gear which increases in thickness from the outer diameter side toward the inner diameter side may be a sintered component formed by a pair of upper and lower molds.

In a third aspect of the present invention, there is provided a sintered internal gear comprising:

a cylindrical gear body having teeth in an inner circumferential surface thereof adapted to be in mesh with a pinion;

a flange portion extending radially inwardly from the cylindrical gear body; and a boss portion provided at an inner diameter portion of the flange portion and mounted on an outer circumferential surface of a shaft;

wherein the cylindrical gear body, the flange portion and the boss portion are formed integrally and sintered, and the boss portion protrudes to both sides in a thickness direction of the flange portion.

Here, at least one of the two protruding portions of the boss portion may have at least a part in an axial direction thereof which progressively decreases in thickness away from the flange portion.

A part in a radial direction of the flange portion may be lower in density than other parts.

All or a part in a radial direction of the flange portion may have a thickness thereof which progressively increases from an outer diameter side toward an inner diameter side and may have a density in the radial direction almost inversely proportional to the thickness.

In a fourth aspect of the present invention, there is provided an internal gear comprising:

a disk-shaped portion having an engagement hole to be fitted over a rotating shaft and expanding radially away from the rotating shaft; and a cylindrical portion having a tooth portion in an inner circumferential surface thereof and connected to an outer circumferential part of the disk-shaped portion;

wherein the cylindrical portion has a density distribution such that the density of an almost central part along a tooth trace of the tooth portions is lower than the density of at least one of end parts in the tooth trace direction of each tooth portion.

Here, the cylindrical portion may be formed of a material having the Young's modulus smaller than a Young's modulus of a material used to make the teeth in mesh with the tooth portion.

The disk-shaped portion and the cylindrical portion may be formed of a porous material.

A part in a radial direction of the disk-shaped portion may be lower in density than other parts.

All or a part in a radial direction of the disk-shaped portion may have a thickness thereof which progressively increases from an outer diameter side toward an inner diameter side and may have a density in the radial direction almost inversely proportional to the thickness.

An internal gear may further include: a boss portion provided in an inner diameter part of the disk-shaped portion and fitted over an outer circumferential surface of the rotating shaft, the boss portion having portions protruding beyond both sides of the disk-shaped portion at the point where the disk-shaped portion meets the boss portion.

At least one of the protruding portions may have at least one part in an axial direction thereof which decreases progressively in thickness away from the disk-shaped portion.

The teeth meshing with the tooth portion may be a pinion that, in combination with the internal gear, forms a part of a planetary gear.

In a fifth aspect of the present invention, there is provided a method of forming an internal gear comprising:

a process of filling molding powder in a cavity of a mold for forming an internal gear, the internal gear comprising a disk-shaped portion having an engagement hole to be fitted over a rotating shaft and expanding radially away from the rotating shaft and a cylindrical portion having a tooth portion in an inner circumferential surface thereof and connected to an outer circumferential part of the disk-shaped portion; and a process of compressing the molding powder filled in the cavity with predetermined pressures so that a density of an almost central part along a tooth trace of the tooth portion of the cylindrical portion is lower than the density of at least one of end parts in the tooth trace direction of each tooth portion to produce a molded internal gear powder body.

Here, the cavity may be formed between press surfaces of a pair of opposing punches and the molding powder filled in the cavity may be compressed by the press surfaces of the pair of punches being moved toward each other.

The molded internal gear powder body may be formed of a material having a Young's modulus smaller than the Young's modulus using in making a material of the teeth in mesh with the tooth portions.

In this invention, the flange portion has a relatively high-density portion and a relatively low-density portion in its radial direction. Vibrations transmitted from the gear body to the flange portion are attenuated by density changes as it is conveyed from high-density part to low-density part or from low-density part to high density part. The vibrations generated in the internal gear are therefore damped.

Further, in this invention, the density of the flange portion decreases from the gear body toward the inner diameter, so that the vibrations transmitted from the gear body to the flange portion are damped by the density change as it is transmitted in the radial direction.

Further, as the thickness of the flange portion increases as the density decreases, the low-density part has a predetermined rigidity.

The sintered internal gear, when incorporated into a transmission, is in contact with oil, which is impregnated into the internal gear by capillary action. The flange portion of the internal gear of this invention has at least a part in the radial direction where the density is low, which is impregnated with a greater amount of oil than in the conventional flange portion. The thermal conductivity is 0.116 (at 20° C.) for iron and about 0.0003–0.0004 (at around 4° C.) for oil, that is, the iron has a much higher thermal conductivity than oil, so that the low-density portion impregnated with a greater amount of oil has its thermal conductivity reduced. As a result, heat transferred to the flange portion is blocked at the low-density portion and is not easily transferred to the shaft side.

The flange portion is the lowest in density on the boss portion side and thus the transfer of heat to the shaft side is reliably blocked here.

Further, because the sintered flange portion is formed by a pair of upper and lower molds so that the thickness of the flange portion progressively increases from the outer diameter side toward the inner diameter side, it can easily be formed into a structure having a low-density portion and a high-density portion.

During the process of compression molding using molds, because the internal gear of this invention does not require aligning the side surface of the flange portion with one end face of the boss portion, the positional tolerance of the molds is alleviated. This makes it possible to prevent a sharp density change at the joint between the flange portion and the boss portion by performing only a strict density control.

A part of the boss portion bulging from the side surface of the flange portion is acted upon from the side by the pressing force of the molds during the compression molding and so that it will not easily collapse in shape.

In this invention, the strength of the joint between the flange portion and the boss portion is secured and at the same time the thickness of the boss portion is made progressively thinner away from the flange portion to reduce the weight of the internal gear.

With this invention, because the density distribution of the cylindrical portion of the internal gear is such that the virtually central part of the tooth along the tooth trace has a smaller density than that of at least one of its ends in the direction of tooth trace, the engagement portion of the internal gear is easily displaced to establish a plane contact, which prevents a rolling fatigue and therefore a pitting from occurring on the tooth surface of the pinion in mesh with the internal gear.

Further, in the cylindrical portion of the internal gear, it is possible to easily form in the almost central part an area with a smaller density than other areas.

The above and other objects, effects, features and advantages of the present invention will become more apparent from the following description of the embodiments thereof taken in conjunction with the accompanying drawings.

BRIEF DESCRIPTION OF THE DRAWINGS

FIG. 8A is a cross section showing another example of the internal gear of this invention along with the planetary gear train in which it is used; and FIG. 8B is a left side view of the example of FIG. 8A;

DETAILED DESCRIPTION OF THE PREFERRED EMBODIMENTS

Embodiments of this invention will be described by referring to the accompanying drawings.

(Embodiment 1)

Figure 1:
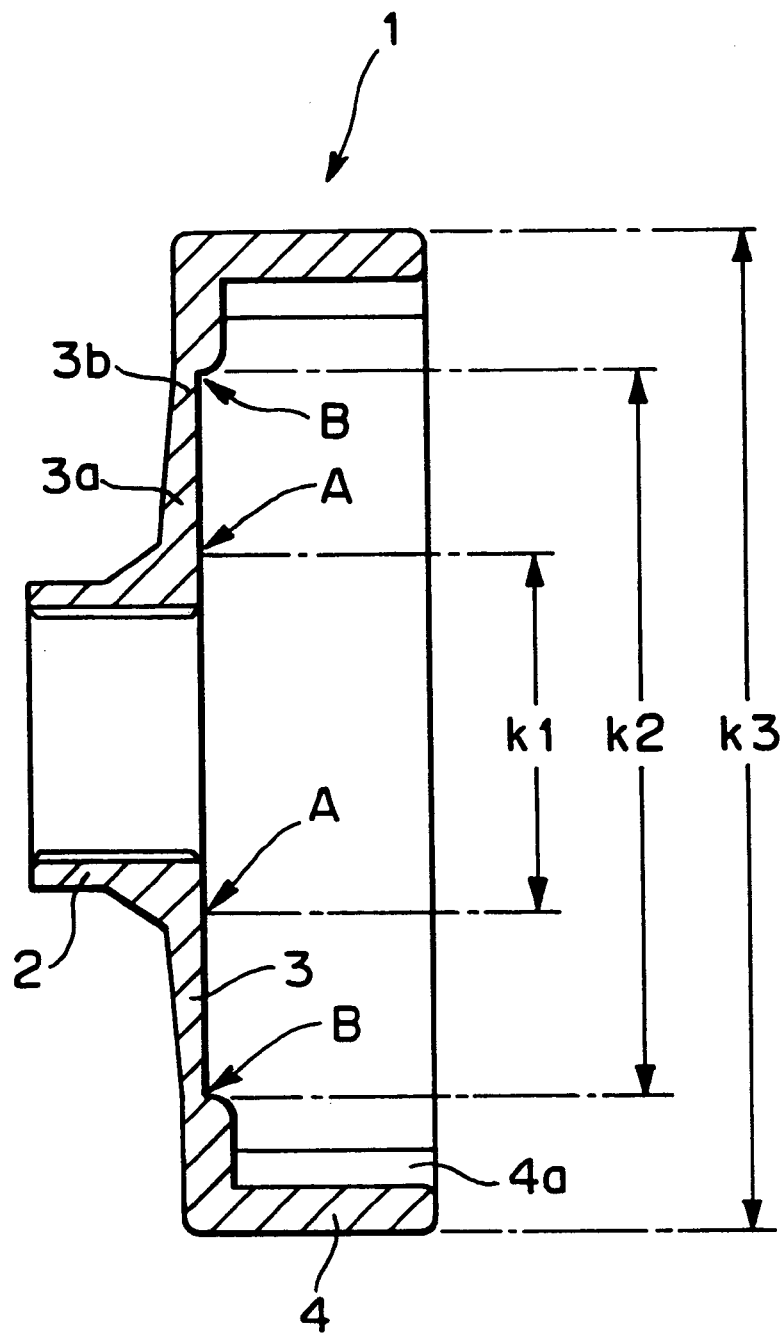
FIG. 1 is a cross section of an internal gear as a first embodiment of the invention.

An internal gear 1 is a bottomed cylindrical component similar in its basic structure to the conventional one and, as shown in FIG. 1, a disk-shaped flange portion 3 rises radially outwardly from a boss portion 2, which is used to mount the internal gear 1 coaxially on the outer circumference of a shaft not shown. A gear body 4 integrally connects to the outer circumferential part of the flange portion 3. The gear body 4 is a cylindrical member coaxial with the boss portion 2 and is formed on its inner circumferential surface along its circumference with a plurality of teeth 4a in mesh with a pinion.

The flange portion 3 of this embodiment is formed into nearly a frustoconical shape on the outer side surface. As shown in FIG. 1, the flange portion 3 is tapered in cross section so that the thickness increases from the outer diameter side toward the inner diameter side, i.e., from the gear body 4 toward the boss portion 2. The flange portion 3 therefore is thicker at a boss portion side 3a than at a gear body side 3b. The density of the flange portion 3 is nearly inversely proportional to the thickness and thus is lower at the boss portion side 3a than at the gear body side 3b.

The internal gear 1 is a sintered component and the compression molding process described below allows the flange portion 3 to be formed with the above settings of the taper and the density distribution in the radial direction.

That is, a mold to form the internal gear 1 is divided concentrically into three parts at positions A and B in FIG. 1 (K1, K2 and K3 represent the edge positions of each divided mold). The mold comprises a first mold (K1 part) to form the boss portion 2, a second mold (K2 part) to form the flange portion 3, and a third mold (K3 part) to form the gear body 4.

A forming surface 6a of an upper punch 6 in the second mold that forms the flange portion 3 is formed conical and, as shown in FIG. 2, is tapered in cross section. FIG. 2 is a schematic diagram illustrating the process of forming the flange portion 3 and thus the shape of the internal gear 1 shown may be slightly different from that of the actual one.

In FIG. 2, reference numeral 7 represents a ore rod and 8 a die. Reference number 12 denotes an upper punch of the first mold, 9 a lower punch of the first mold, 10 a lower punch of the second mold and 11 a lower punch of the third mold.

Figure 2A:
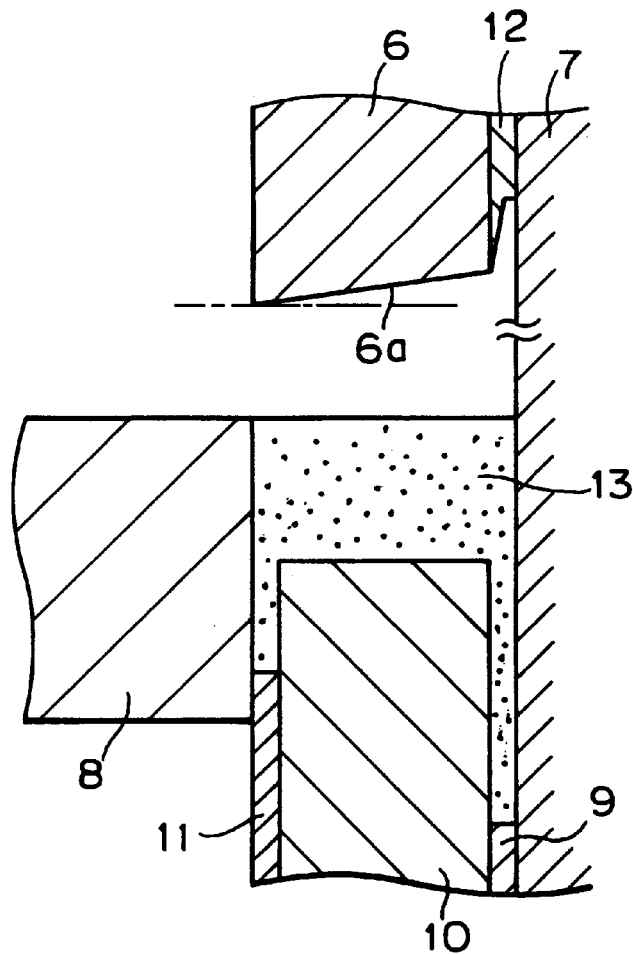
FIG. 2 is a schematic diagram showing the process of compression molding the flange portion of the first embodiment, FIG. 2A illustrating the state of powder before being pressed and FIG. 2B illustrating the same being pressed.
Figure 2B:
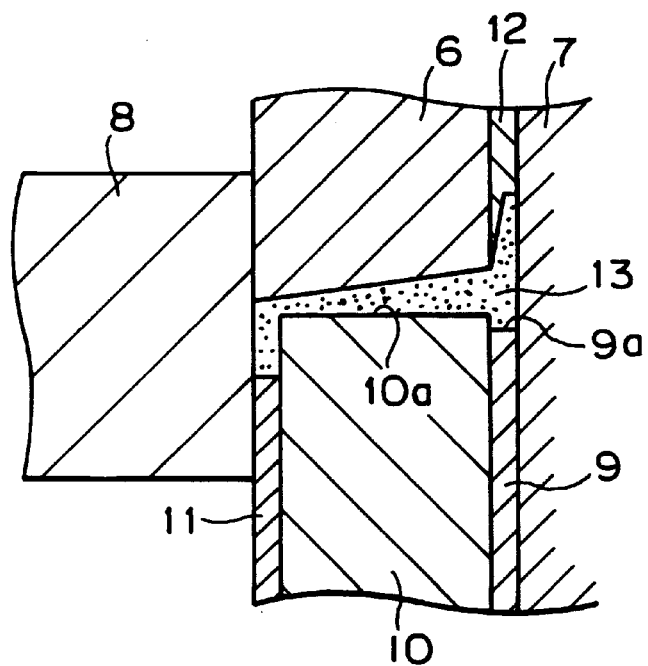

The flange portion 3 of the above construction is formed as follows. As shown in FIG. 2A, powder 13 is uniformly laid over the lower punches 9, 10, 11, after which, as shown in FIG. 2B, the upper punches 6, 12 are lowered from above to compress and mold the powder 13. Because the upper mold's forming surface is tapered, the flange portion 3 is tapered. Before pressing, the powder 13 is laid uniformly in the radial direction, so that the density after compression is virtually inversely proportional to the thickness of the flange portion 3. That is, the density decreases toward the core rod 7 side, i.e., toward the boss portion side 3a.

After the compression molding, the molded powder is sintered to form the internal gear 1 of the above structure.

The internal gear 1 is a sintered component and thus has pores. Because the porous factor is proportional to the density, the number of pores is greater in the low-density portion, i.e., in the boss portion side 3a.

Hence, when the internal gear 1 is immersed in oil to allow oil to be impregnated into the internal gear 1, the boss portion side 3a of the flange portion 3, which is low in density, is impregnated with a greater amount of oil. This causes the boss portion side 3a to be set with a small thermal conductivity.

Figure 3:
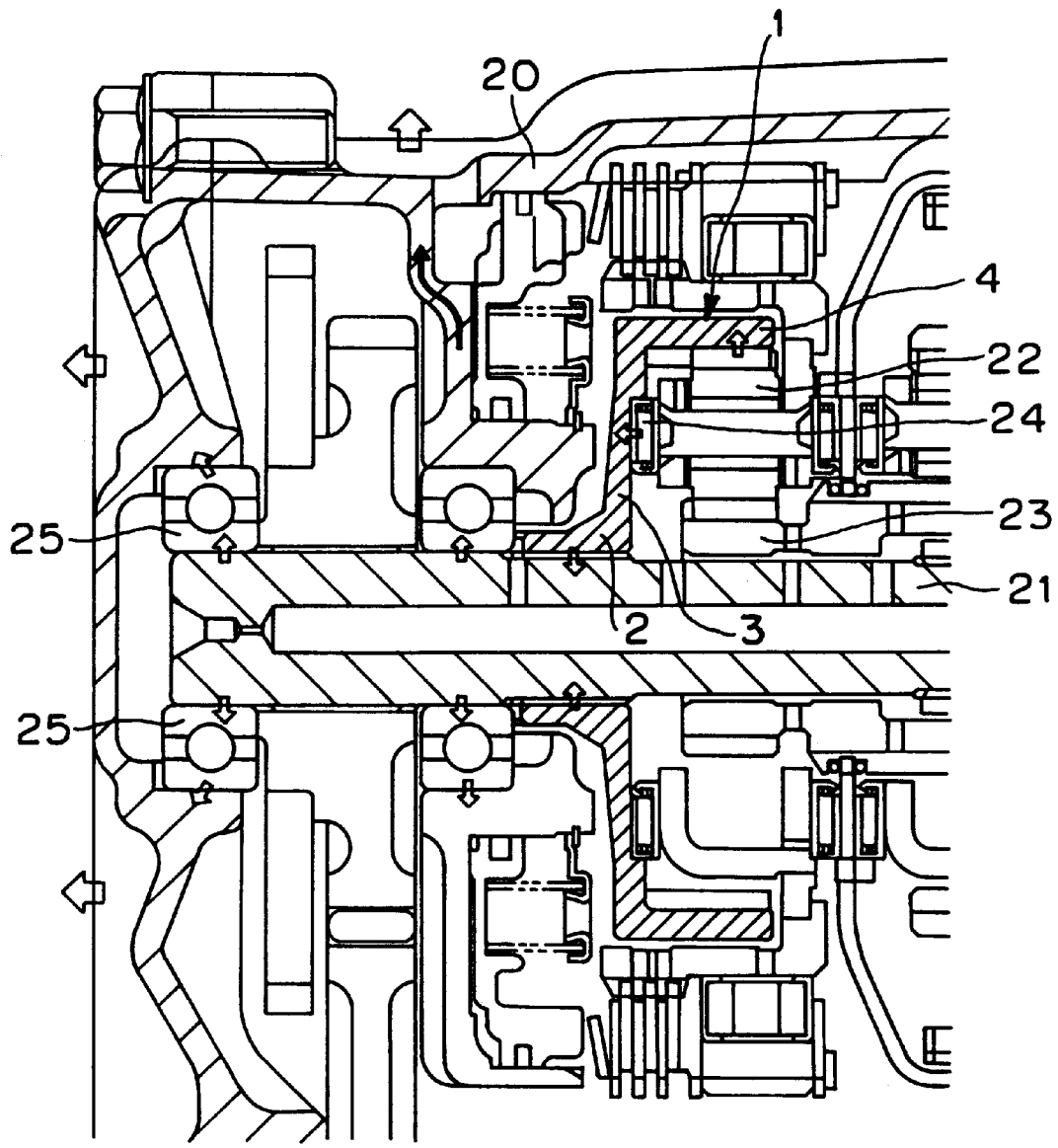
FIG. 3 is a cross section showing the internal gear of this invention incorporated in a case of the transmission.
Figure 4:
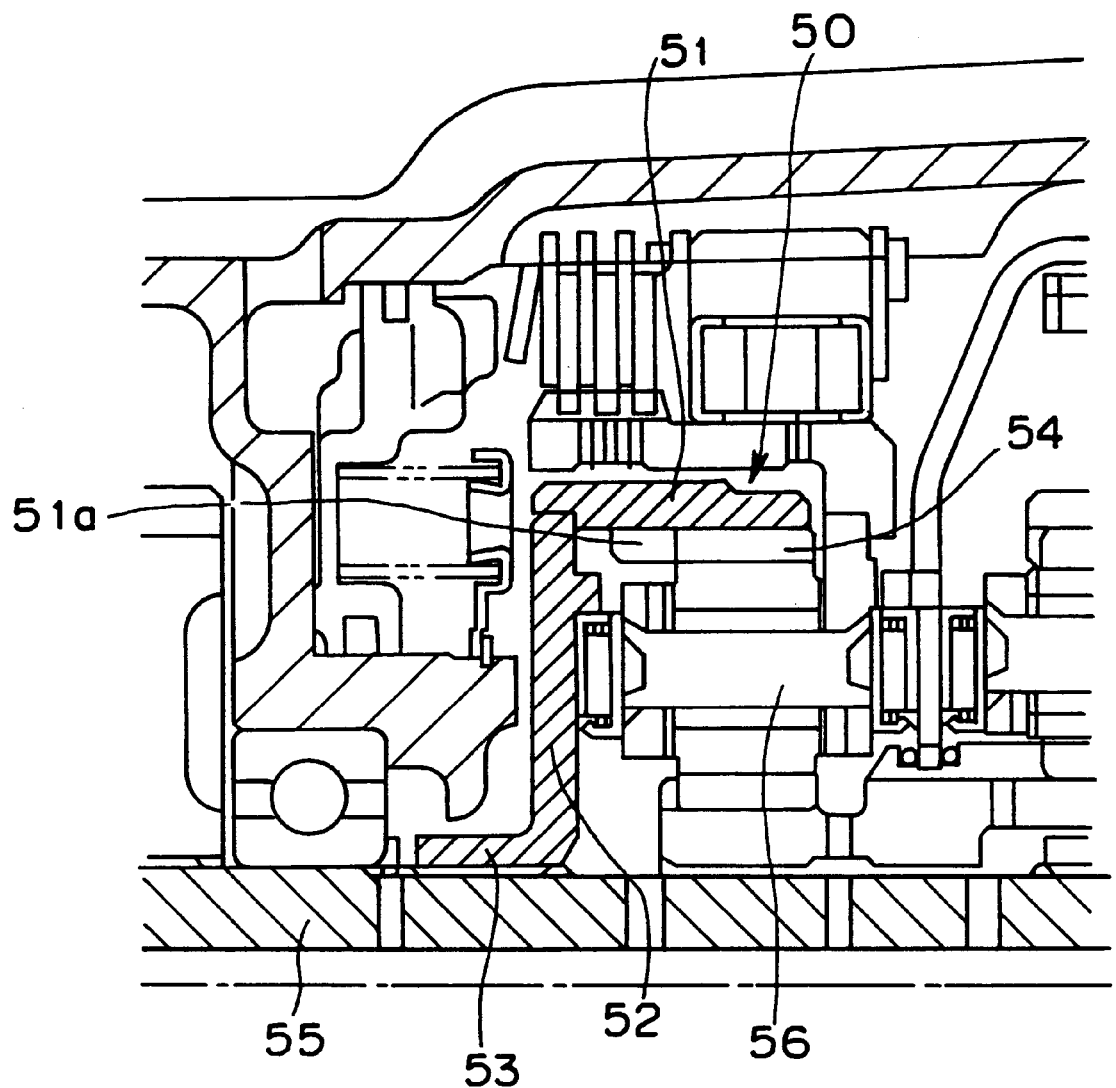
FIG. 4 is a cross section showing a conventional internal gear incorporated in the case of the transmission.

Then the internal gear 1 is sleeved, through a spline, over a shaft 21 installed in a transmission case 20 so that the boss portion 2 of the internal gear 1 is coaxial with the shaft, as shown in FIG. 3. In this way, the internal gear 1 is installed in the transmission.

In FIG. 3, reference number 22 represents a pinion meshed with teeth 4a on the inner circumferential surface of the gear body 4. Number 23 represents a sun gear which, in combination with the internal gear 1 and the pinion 22, forms a planetary gear.

Next, the operation and advantages of the internal gear 1 will be described.

When the transmission is started to drive the above planetary gear, vibrations caused by errors in the meshing between the gear body 4 of the internal gear 1 and the pinion 22 are transmitted from the meshing part of the pinion 22 and the gear body 4 to the gear body 4 of the internal gear 1. Because the boss portion 2 of the internal gear 1 is fixed to the shaft 21, the vibrations of the gear body 4 is transmitted to the flange portion 3 which is then vibrated. The flange portion 3 of this embodiment has its density set to decrease progressively from the outer diameter side toward the inner diameter side, so that the transmitted vibrations are attenuated in the low-density portion. Thus the vibrations of the entire internal gear 1 are damped.

Further, during the operation of the planetary gear, heat produced by shearing force generated by the meshing between the internal gear 1 and the pinion 22 and also heat transferred from the carrier side to a thrust bearing 24 are, as shown by arrows in FIG. 3, transferred through the flange portion 3 to the shaft 21 side and further to a shaft supporting bearing 25 and a case 20 (made of aluminum) and then dissipated outside the transmission.

In this embodiment, the amount of oil impregnated into the flange portion 3 increases toward the boss portion 2, i.e., the thermal conductivity in the flange portion 3 decreases toward the boss portion side 3a. Hence, the heat transmitted to the flange portion 3 of the internal gear 1 is blocked or substantially prevented from advancing further by the low-density portion at the boss portion side 3a.

The fact that the dissipation of heat produced by the internal gear 1 to the outside of the case 20 is restricted helps warm the oil in the transmission faster than in the conventional transmission even when the transmission is started from a cold state, thus minimizing the harm the cold oil does to the transmission.

While in the above embodiment the flange portion 3 and the gear body 4 of the internal gear are integrally formed, they may be manufactured as separate parts.

Further, although in the above embodiment the thickness of the flange portion 3 is set to increase toward the boss portion 2, the thickness may be uniform provided that there is a gradient in density so that the density progressively decreases in the inward radial direction.

Although in the above embodiment the thickness of the flange portion 3 is changed smoothly from the gear body 4 toward the boss portion 2, other configurations may be employed. For example, the thickness may be changed in multiple steps to make the density inversely proportional to the thickness.

In this embodiment, the internal gear 1 is a sintered component but it may be formed of other materials such as steel. In this case, too, a low-density portion formed at one location of the flange portion in the radial direction will damp vibrations.

As explained above, the internal gear of the first embodiment of this invention can damp vibrations of the internal gear generated during the operation of the planetary gear.

These desirable effects can be produced while maintaining a specified rigidity in the internal gear. Forming the internal gear as a sintered component allows easy setting of density.

When this internal gear is assembled in the transmission, the low-density part of the flange portion is impregnated with a greater amount of oil, reducing the thermal conductivity of that part and thus making it difficult for heat produced during the operation of the transmission to be transferred to the shaft. This limits the dissipation of heat through the shaft to the outside of the transmission. As a result, when the transmission is operated from the cold state, oil can be warmed fast, reducing or eliminating various harms of cold oil.

Making the boss portion side low in density effectively reduces or blocks thermal conduction. With this embodiment, the density of the molded flange portion of the internal gear can be set almost inversely proportional to the thickness of the flange portion simply by using an upper mold with an inclined forming surface, laying powder over a lower mold uniformly in the radial direction before compression molding, and compression-molding the powder by a pair of upper and lower molds. The internal gear therefore can be formed into a structure having the high- and low-density portions.

Next, a second embodiment of this invention will be described by referring to FIGS. 5 and 6. Like reference numerals will be used to describe elements that are functionally identical with those of the previous embodiment.

Figure 5:
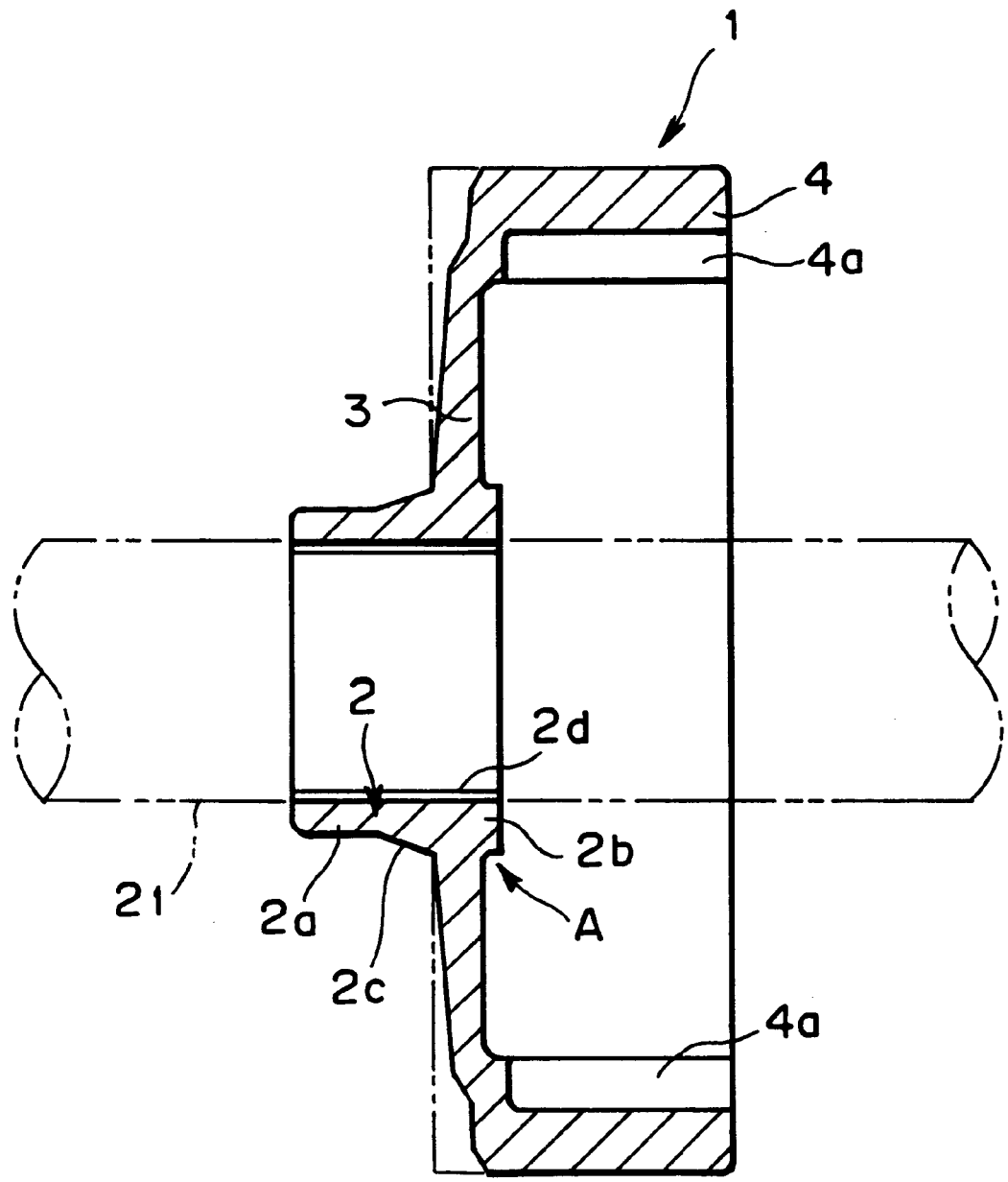
FIG. 5 is a cross section of the internal gear as a second embodiment of this invention.

The internal gear 1 of this embodiment is a bottomed cylindrical component with its basic construction similar to that of the conventional one and, as shown in FIG. 5, comprises a boss portion 2, a flange portion 3 and a gear body 4.

The gear body 4 is cylindrical and has a plurality of teeth 4a arranged on and along its inner circumferential surface that mesh with a pinion. The entire circumference of one axial end of the gear body 4 continuously connects to the flange portion 3. The flange portion 3 is disk-shaped and its entire outer circumferential part integrally connects to the gear body 4 and extends toward the inner diameter side. At the center of the inner diameter side of the flange portion 3 there is an opening to pass the shaft 21. The inner diameter part of the flange portion 3 integrally connects to the boss portion 2.

The boss portion 2 is shaped like a cylinder axially protruding from each side surface of the flange portion 3. In more detail, the boss portion 2 has a first projection 2a projecting outwardly long in a direction opposite the gear body 4 and a second projection 2b projecting short toward the gear body 4 side.

The first projection 2a is axially tapered on its outer circumferential surface over a predetermined axial length, as shown at 2c, so that the thickness or outer diameter of the projection decreases away from the flange portion 3.

The inner diameter surface of the boss portion 2 is formed with a plurality of splined teeth 2d along its circumference.

The internal gear 1 is an integral component formed by sintering. In compression-molding the integrally formed and sintered internal gear into the above shape, the multi-stage forming method is employed which uses a multi-divided mold similar to the one used in the previous embodiment.

The mold to form the internal gear 1 of the shape described above is as shown in FIG. 2. The lower punch is divided into three, a first lower punch 11 to press and mold the gear body 4, a second lower punch 10 to compression-mold the flange portion 3 and a third lower punch 9 to compression-mold the boss portion 2. The upper punch is divided into a first upper punch 6 to compression-mold the gear body 4 and the flange portion 3 and a second upper punch 12 to compression-mold the boss portion 2.

The mold split position between the boss portion and the flange portion is set at where the diameter of the tapered part 2c of the first projection 2a is maximum. In FIG. 2, reference number 7 designates a core rod and 8 a die.

First, as shown in FIG. 2A, the powder 13 is laid on the lower punches uniformly so that its upper surface is flat. At this time, the first lower punch 11 and the third lower punch 9 are lowered relative to the second lower punch 10 to adjust the amount of powder in each portion to make the compression ratios in different portions equal.

Next, the upper punches 6, 12 are lowered to contact the upper surface of the powder 13 and the positions of the upper and lower punches are adjusted (not shown). After this, while the moving speed and the amount of displacement of the punches are controlled according to the change in thickness to perform a strict density control, the pressure is increased until the thickness is compressed to one third, for example, the pre-compression thickness. Now, the powder is molded into the shape shown in FIG. 6.

Next, the compression-molded powder is sintered at elevated temperatures below the melting point to be alloyed. Then sizing is performed as required. Now, the integrally molded, sintered internal gear 1 is obtained.

In the internal gear 1 of the above shape, the provision of the second projection 2b obviates the need to control the forming surface 10a of the second lower punch 10 and the forming surface 9a of the third lower punch 9 at the same heights during the compression molding. This alleviates the tolerances, which in turn prevents a sharp density change from occurring in a joint A between the flange portion 3 and the boss portion 2 where the mold is divided, even when the compression molding is done by only performing a strict control on the density without making a strict positional control. That is, not only does the internal gear shape of this embodiment reduce the complexity of control required during molding operation but it also prevents the occurrence of sharp density changes in the joint A between the flange portion 3 and the boss portion 2.

Figure 6:
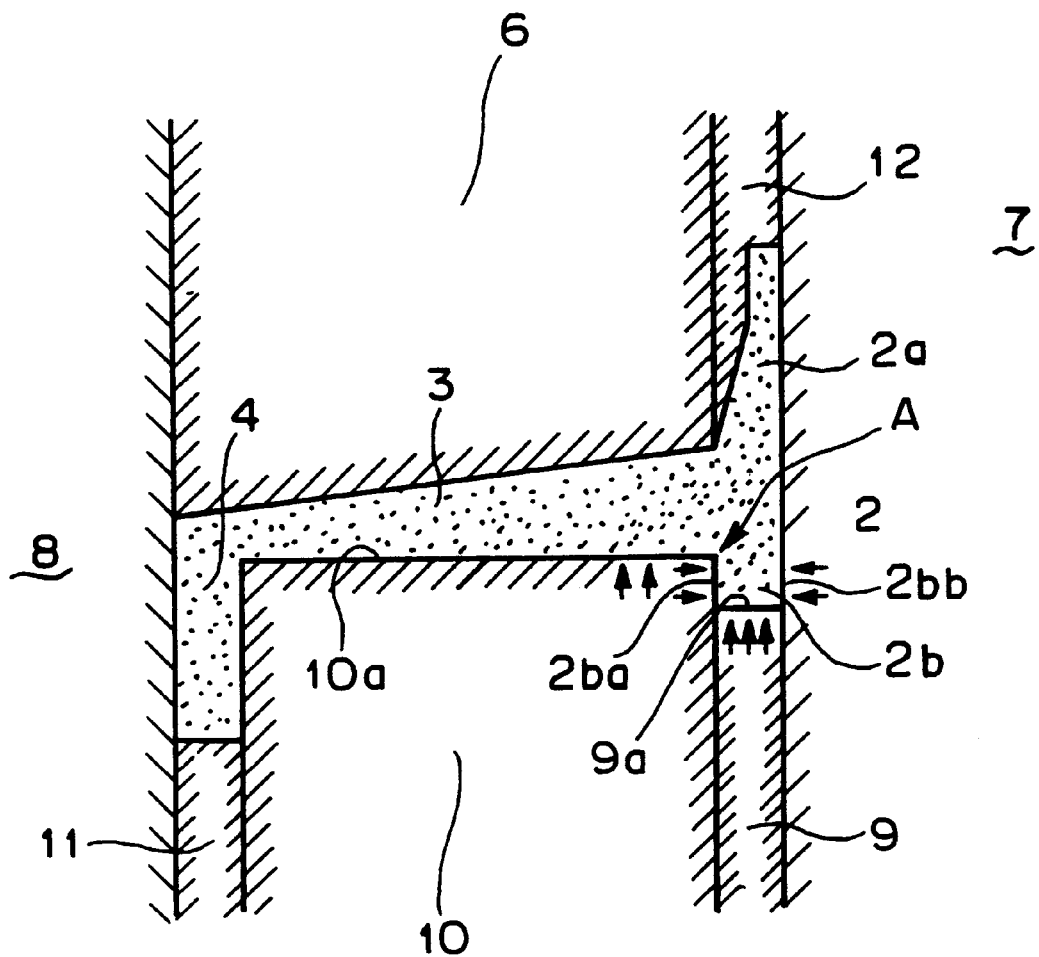
FIG. 6 is a cross section showing a pressing force acting on a second protruding portion during the process of forming the internal gear of FIG. 5.

Because the second projection 2b is also applied at their side surfaces 2ba, 2bb with a pressing force from the surfaces of the punches, as shown in FIG. 6, it does not easily collapse as does the conventional gear.

The provision of the tapered part 2c to the first projection 2a reduces the weight of the boss portion 2 and also allows the thickness change in the radial direction of the joint between the boss portion 2 and the flange portion 3 and its surrounding areas to be set moderate. This also prevents a sudden change in the density. The joint A may be rounded.

While this embodiment provides the tapered part 2c to the first projection 2a, the tapered part 2c may be omitted. It is also possible to form a taper on the second projection 2b. In the internal gear 1 of this embodiment, the outer side surface is tapered such that, as shown in FIG. 5, the thickness of the flange portion 3 decreases from the boss portion 2 side toward the gear body 4 side, thus realizing a further reduction in the weight of the internal gear.

As described above, the shape of the internal gear of this embodiment facilitates the control of the molding process and prevents a sharp density change in a joint between the flange portion and the boss portion. Therefore, even in an integrally molded, sintered internal gear, the joint between the flange portion and the boss portion can be provided with a stable strength against a torsional torque by adopting the internal gear shape of this invention.

Figure 7:
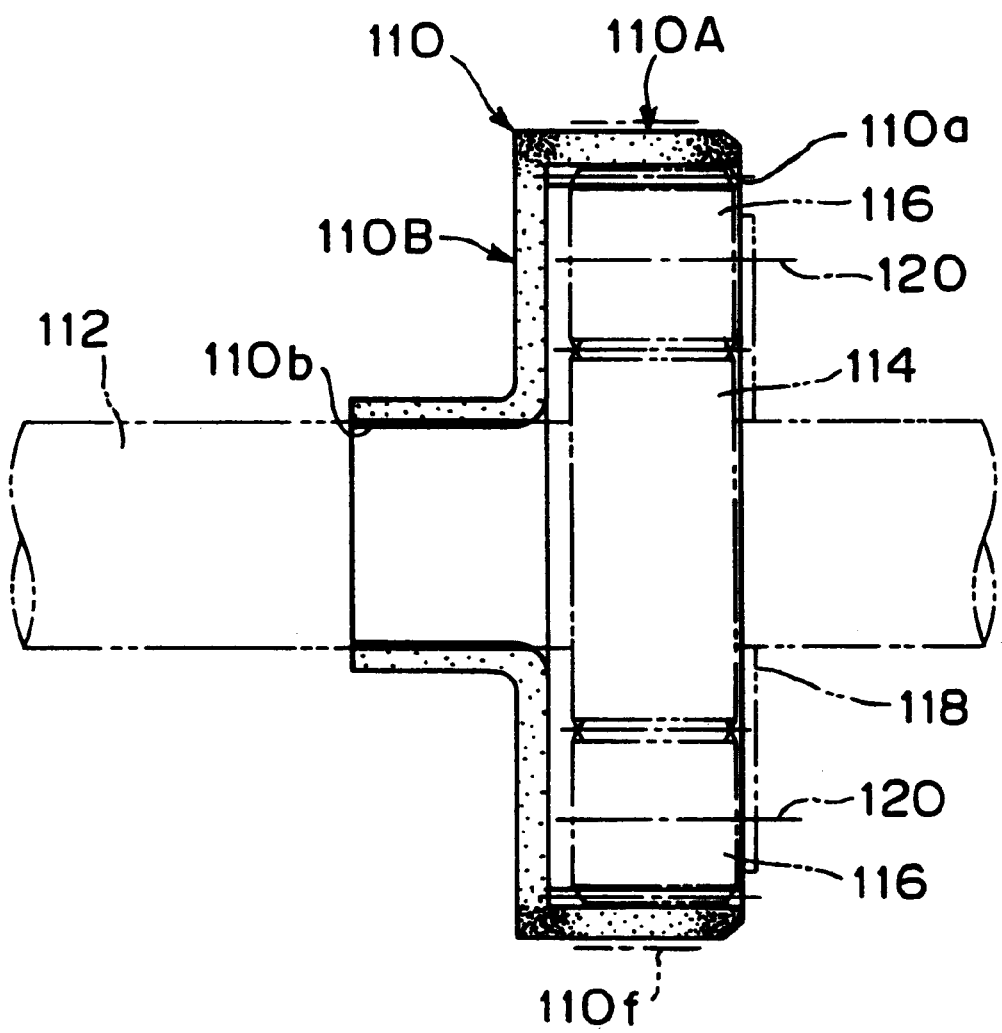
FIG. 7 is a cross section showing a third embodiment of the internal gear along with the planetary gear in which it is used.

FIG. 7 shows a third embodiment of the internal gear of this invention along with a planetary gear train to which it is applied.

In FIG. 7, the planetary gear train comprises, as major elements, a sun gear 114 mounted on a rotating splined shaft 112; a plurality of pinions 116 in mesh with the sun gear 114 and rotated around the sun gear 114; and an internal gear 110 mounted on the rotating shaft 112, meshed with the pinions 116 and enclosing the pinions 116 and the sun gear 114.

Each pinion 116 is rotatably supported on the pinion shaft 120 secured at one end to a carrier plate 118.

The internal gear 110, made of a porous metal material, includes a disk-shaped portion or flange portion 110B having a hub or boss formed with a spline hole 110b fitted over the rotating shaft 112; and a cylindrical portion or gear body portion 110A connecting to the outer circumferential part of the disk-shaped portion 110B and having tooth portions 110a in its inner circumferential surface in mesh with the pinions 116.

The internal gear 110 is made of, for example, high-density sintered steel (SMF4040 of JPMA code). This high-density sintered steel may have a Young's modulus of about 14,000–16,000 kg/mm$^2$ and an average density of about 6.8–7.3 g/cm$^3$. The tooth portions 110a are left-twisted, helical involute teeth.

The pinions 116, which are helical gears, are made of, for instance, steel (SCr420H of JIS code). This steel may have a Young's modulus of about 21,000–22,000 kg/mm$^2$. The reason that the Young's modulus of the internal gear 110 is small compared with that of the pinions 116 is that the surface pressure acting on the tooth portions 110a is smaller than the surface pressure acting on the engagement surface of the pinions 116. Because the internal gear 110 is made of a porous material and its Young's modulus is made smaller than the Young's modulus of the pinions 116, variations in the meshing precision are absorbed and the meshing gears' ability to adjust themselves for smooth engagement during the initial stage of operation is improved.

The density distribution of the cylindrical portion 110A of the internal gear 110 is such that there are high- and low-density areas along the tooth trace of the tooth portions 110a and that the density of a central part 110f of the cylindrical portion 110A is set at about 0.1–0.2 g/cm$^3$ lower than the density of the part connecting to the outer circumferential edge of the disk-shaped portion 110B and the density of the free end part of the cylindrical portion 110A.

Hence, the tooth portions 110a of the internal gear 110 in mesh with the tooth portions of the pinions 116 can easily be displaced along a normal plane perpendicular to the tooth surface, so even when the parallelism between the rotating axes of the pinions 116 and the internal gear 110 exceeds the allowable limit, a plane contact rather than a point contact is established in the meshing action, eliminating undesired pitting that would otherwise be produced on both ends of the pinions 116.

FIG. 8A shows a further example of the internal gear of this invention along with a planetary gear train to which it is applied. In FIG. 8A, like reference numerals will be used to denote constitutional elements that are identical with those of FIG. 7 and their explanation will be omitted.

In the example shown in FIG. 8A, the internal gear 122 made of a porous metal includes a disk-shaped portion 122B having a hub formed with a spline hole 122b fitted over the rotating shaft 112, and a cylindrical portion 122A connecting to the outer circumferential edge of the disk-shaped portion 122B and having tooth portions 122a in its inner circumferential surface in mesh with the pinions 116.

The internal gear 122 may be formed of a high-density sintered steel (SMF4040 of JPMA code). This high-density sintered steel may have a Young's modulus of about 14,000–16,000 kg/mm$^2$ and an average density of about 6.8–7.0 g/cm$^3$. The tooth portions 122a are left-twisted, helical involute teeth.

The outer circumferential edge of the disk-shaped portion 122B is formed with engagement pieces 122d at predetermined intervals along its circumference which engage with notches formed at one end of the cylindrical portion 122A, as shown in FIG. 8B.

One end of the cylindrical portion 122A, as shown in FIG. 8B, is formed with a plurality of engagement claws 122c at predetermined intervals in its circumferential direction. The inner circumferential portion of each engagement claw 122c is formed with a groove 122g in which a retainer ring not shown is installed.

Figure 9:
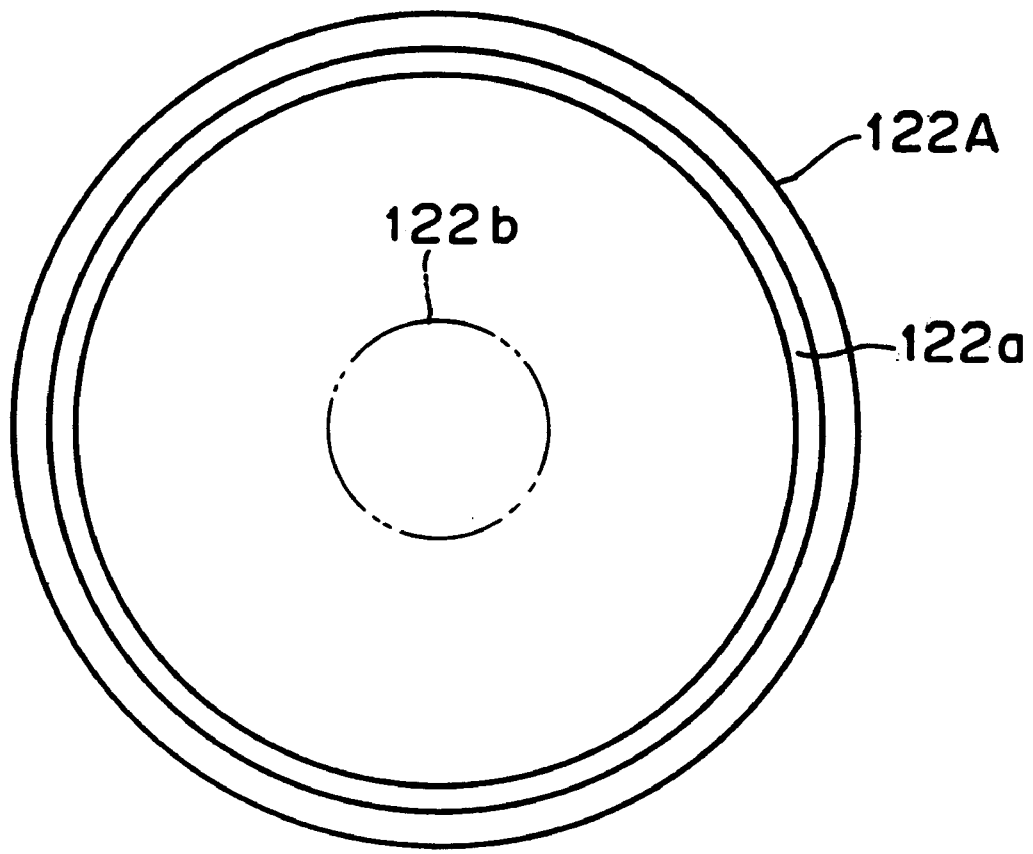
FIG. 9 is a right side view of the example of FIG. 8A.

Thus, the engagement pieces 122d of the disk-shaped portion 122B are fitted into the notches formed between the engagement claws 122c of one end of the cylindrical portion 122A, and the retainer ring is inserted into the groove 122g to connect the disk-shaped portion 122B and the cylindrical portion 122A together. As a result, as shown in FIG. 9, the center of the spline hole 122b of the disk-shaped portion 122B is aligned with the center of the cylindrical portion 122A.

Figure 10:
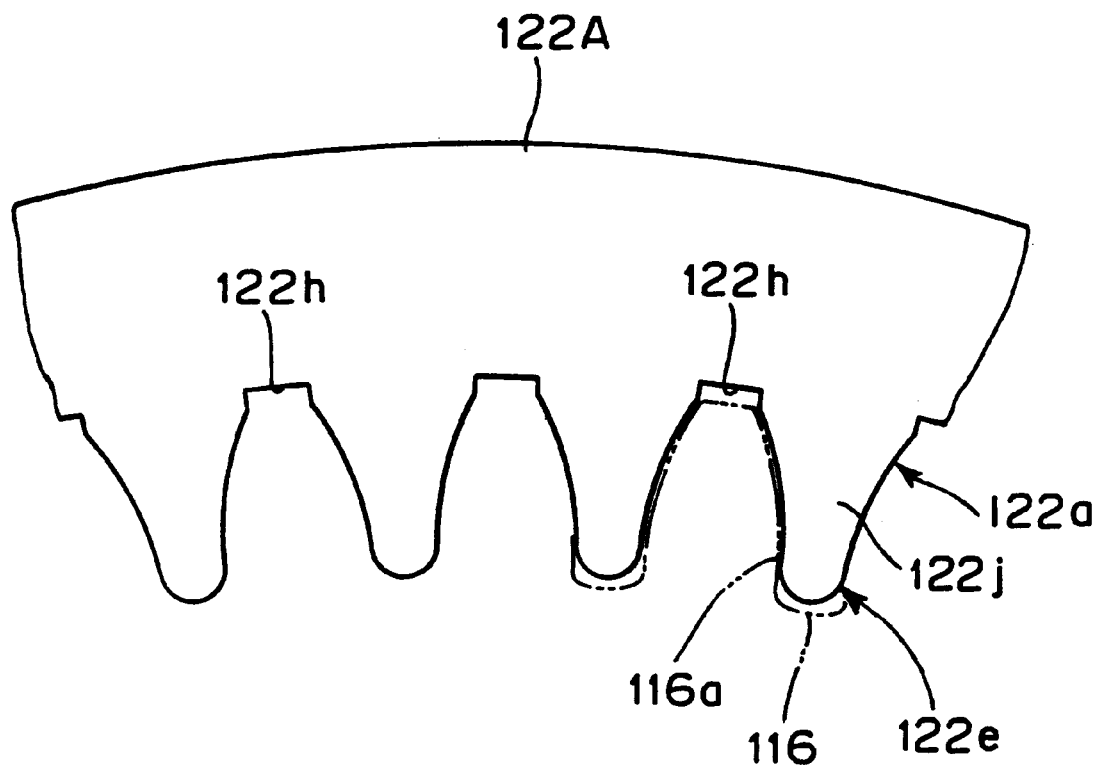
FIG. 10 is a partially enlarged view of tooth portions of the example shown in FIG. 8.

The tooth portions 122a of the cylindrical portion 122A, as shown enlarged in FIG. 10, have tooth grooves 122h with which teeth 116a of the pinions 116 engage, and also have teeth 122j formed between the tooth grooves 122h along the circumferential direction.

The teeth 122j have their tooth crest surfaces 122e formed in an edgeless arc between its tooth faces. Because the tooth crest surface 122e is formed in an arc, the interference between the teeth 116a of the pinions 116 and the teeth 122j of the tooth portions 122a of the cylindrical portion 122A is reduced, preventing pitting from occurring on the tooth surfaces of the teeth 116a of the pinions 116. This also prolongs the life of the mold that forms the internal gear 122.

Further, the density distribution of the cylindrical portion 122A of the internal gear 122 is such that there are high- and low-density areas along the tooth trace of the tooth portions 122a and that the density of a central part 122f of the cylindrical portion 122A is set at about 0.1–0.2 g/cm$^3$ lower than the density of the part connecting to the outer circumferential edge of the disk-shaped portion 122B and the density of the free end part of the cylindrical portion 122A.

Therefore, in this example, too, the effects and advantages similar to those of the previous examples can be obtained.

Figure 11:
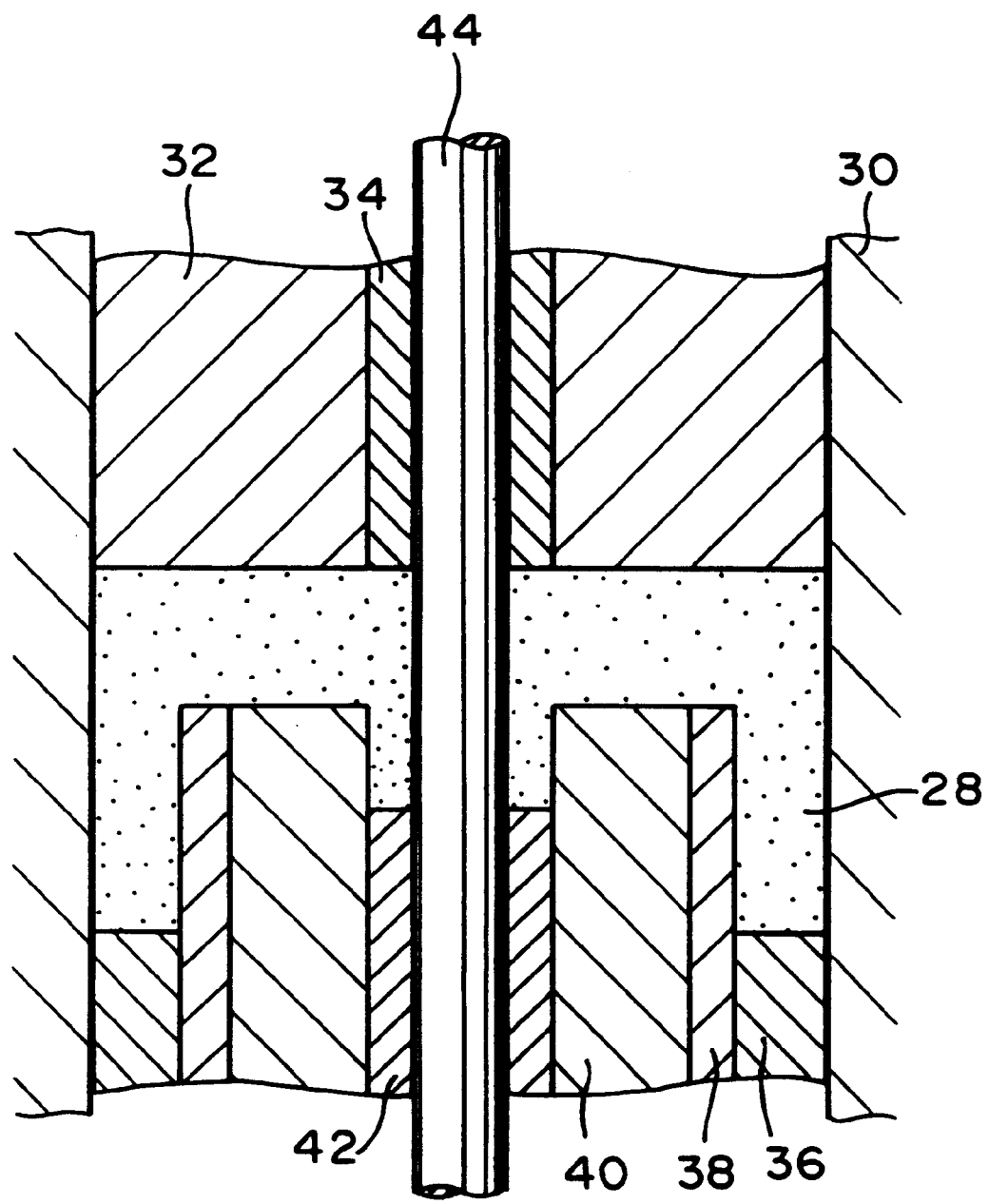
FIG. 11 is a cross section showing an essential part of a molding device used by one example method of forming the internal gear of this invention.

FIG. 11 shows an essential part of the molding device that implements one example method of forming the internal gear of this invention. In FIG. 11, the molding device comprises a die body 30, which has an inner circumferential surface for forming the outer circumferential surface of the cylindrical portion 110A of the internal gear 110 to be formed and constitutes an outer shell of the device, and a core rod 44 which is arranged at almost the center inside the die body 30 and supported reciprocally movable along its center axis. The upper mold includes a second upper punch 34, which is fitted over the upper part of the core rod 44 and forms the end face of the hub of the disk-shaped portion 110B of the internal gear 110, and a cylindrical first upper punch 32, which has an inner circumferential surface slidably sleeved over the outer circumferential surface of the second upper punch 34 and is arranged concentric with the core rod 44 between the inner surface of the die body 30 and the second upper punch 34.

The core rod 44 may be a splined shaft corresponding to the spline hole 110b of the internal gear 110. The second upper punch 34 is movably fitted over the core rod 44 and the first upper punch 32 is supported slidable relative to the outer circumferential surface of the second upper punch 34 and the inner circumferential surface of the die body 30.

The lower mold of this device includes a fourth lower punch 42, which is fitted over the lower part of the core rod 44 so as to be opposed to the second upper punch 34; a cylindrical third lower punch 40 which has an inner circumferential surface slidably fitted over the outer circumferential surface of the fourth lower punch 42 and is opposed to the first upper punch 32; a second lower punch 38 which has an inner circumferential surface slidably fitted over the outer circumferential surface of the third lower punch 40; and a first lower punch 36 which has an inner circumferential surface slidably fitted over the outer circumferential surface of the second lower punch 38 and is disposed between the inner circumferential surface of the die body 30 and the outer circumferential surface of the second lower punch 38.

The fourth lower punch 42 is to form the end face of the hub of the disk-shaped portion 110B of the internal gear 110 to be formed. The third lower punch 40 is to form the inner surface of the disk-shaped portion 110B of the internal gear 110. The second lower punch 38 is to form the tooth portions 110a of the cylindrical portion 110A of the internal gear 110. The first lower punch 36 is to form the end face of the tooth portions of the cylindrical portion 110A of the internal gear 110.

The first upper punch 32 and the second upper punch 34 are supported by drive mechanisms not shown so that they are movable relative to the inner surface of the die body 30 and the core rod 44.

The first lower punch 36, the second lower punch 38, the third lower punch 40 and the fourth lower punch 42 are supported by drive mechanisms not shown so that they are movable relative to the inner surface of the die body 30 and the core rod 44.

The second lower punch 38 has at a part of its outer circumferential portion helical tooth portions corresponding to the tooth portions 110a of the internal gear 110 and is supported rotatable relative to the first lower punch 36 and the third lower punch 40.

Thus, a cavity to be filled with metal powder 28 as a molding material is formed in the die body 30 between the end faces of the first upper punch 32 and the second upper punch 34 and the end faces of the first lower punch 36, the second lower punch 38, the third lower punch 40 and the fourth lower punch 42.

In this construction, the internal gear 110 is formed as follows. First, as shown in FIG. 11, the first upper punch 32 and the second upper punch 34 are aligned so that their end faces are on the same plane, and the second lower punch 38 and the third lower punch 40 are aligned so that their end faces are on the same plane. The first lower punch 36 and the fourth lower punch 42 are disposed so that their end faces are lower than the end faces of the second lower punch 38 and the third lower punch 40 in FIG. 11.

Figure 12:
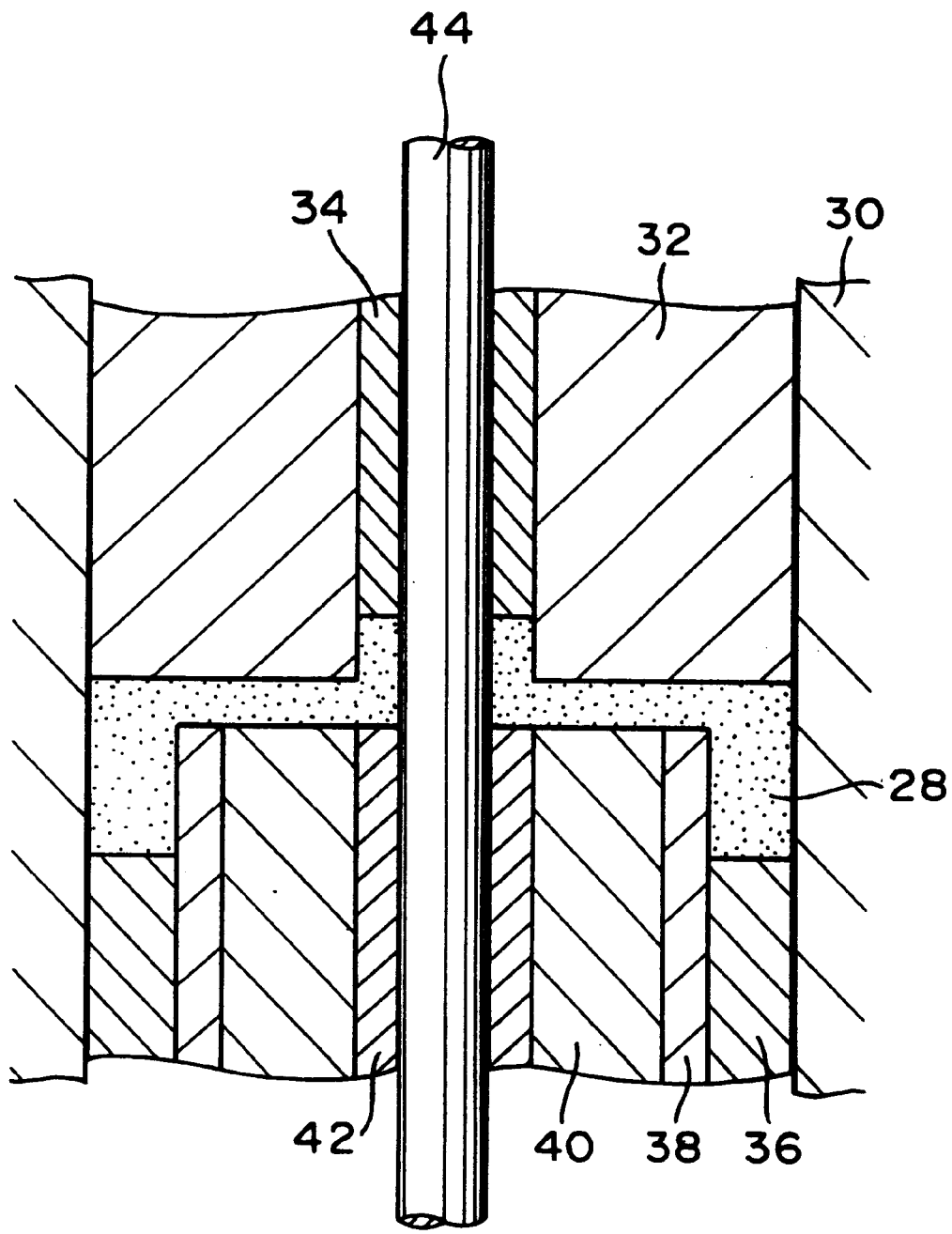
FIG. 12 is a cross section used for the explanation of the process in the example of FIG. 11.

Next, as shown in FIG. 12, the second upper punch 34 is moved a predetermined distance toward the end face of the fourth lower punch 42 and at the same time the first upper punch 32 is moved toward the end face of the fourth lower punch 42 until the end face of the first upper punch 32 is lower than the end face of the second upper punch 34. The fourth lower punch 42 is moved toward the end face of the second upper punch 34 from the position shown in FIG. 11 along the second lower punch 38 and the third lower punch 40 until its end face is flush with the end faces of the second lower punch 38 and the third lower punch 40. The first lower punch 36 also is moved toward the end face of the first upper punch 32.

As a result, the metal powder 28 filled in the cavity is moved from the position shown in FIG. 11 to the position shown in FIG. 12 inside the die body 30.

Figure 13:
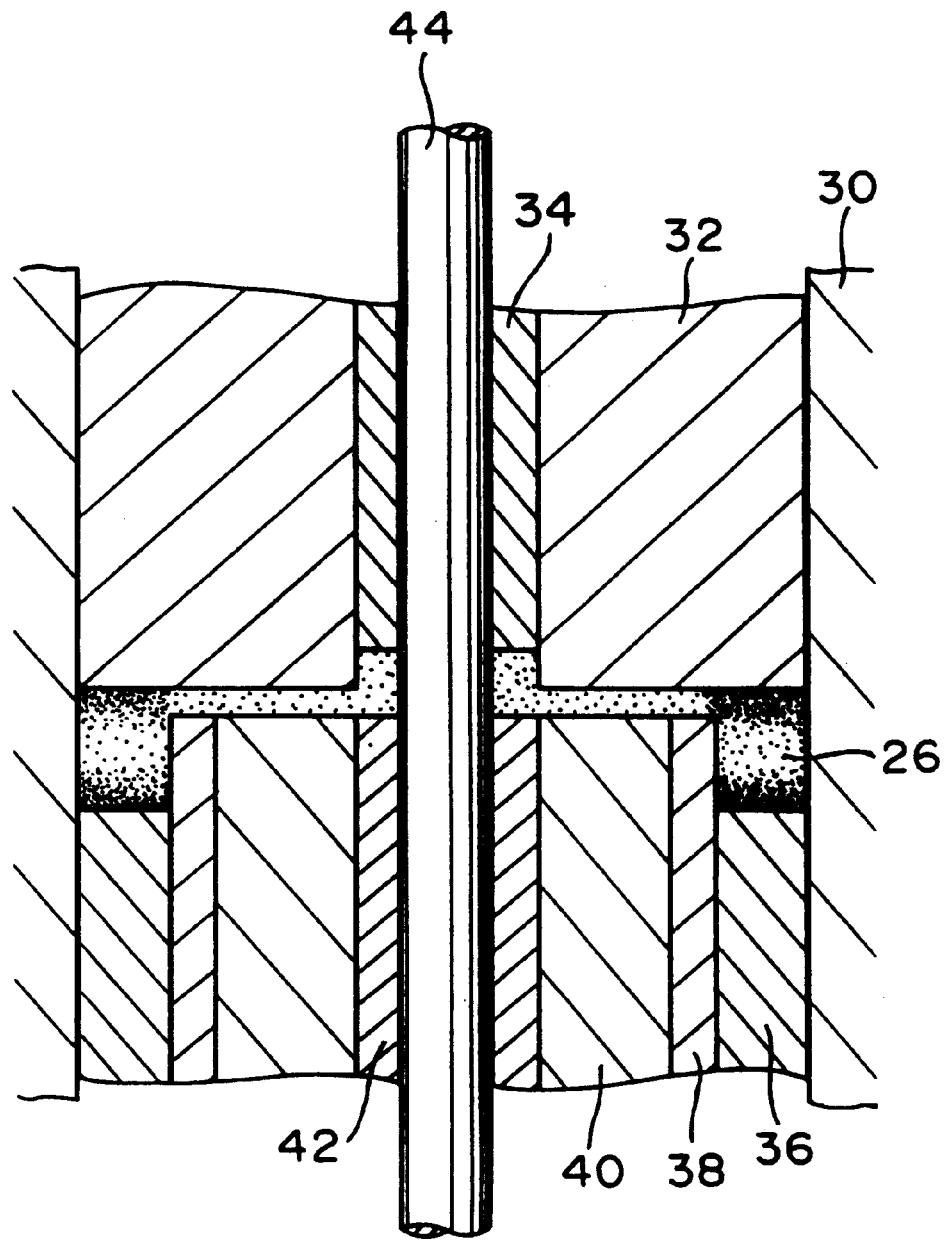
FIG. 13 is a cross section used for the explanation of the process in the example of FIG. 11.

Then, as shown in FIG. 13, the first upper punch 32 and the second upper punch 34 and the first lower punch 36, the second lower punch 38, the third lower punch 40 and the fourth lower punch 42 are moved predetermined distances at predetermined timings toward each other to press the metal powder 28 with predetermined pressures to produce a molded powder body 26.

At this time, a part of the molded powder body 26 corresponding to the cylindrical portion 110A of the internal gear 110 has a density distribution such that the density of the central part is about 0.1–0.2 g/cm$^3$ lower than the density of the free end in the tooth trace direction of the tooth portion 110a and the density of the end connecting to the disk-shaped portion 110B.

Next, the first upper punch 32 and the second upper punch 34 are moved away from the first lower punch 36, the second lower punch 38, the third lower punch 40 and the fourth lower punch 42. After this, the second lower punch 38, while being pulled, is rotated in one direction with respect to the molded powder body 26. At the same time the core rod 44 is pulled from the molded powder body 26, which is then taken out of the die body 30.

Figure 14:
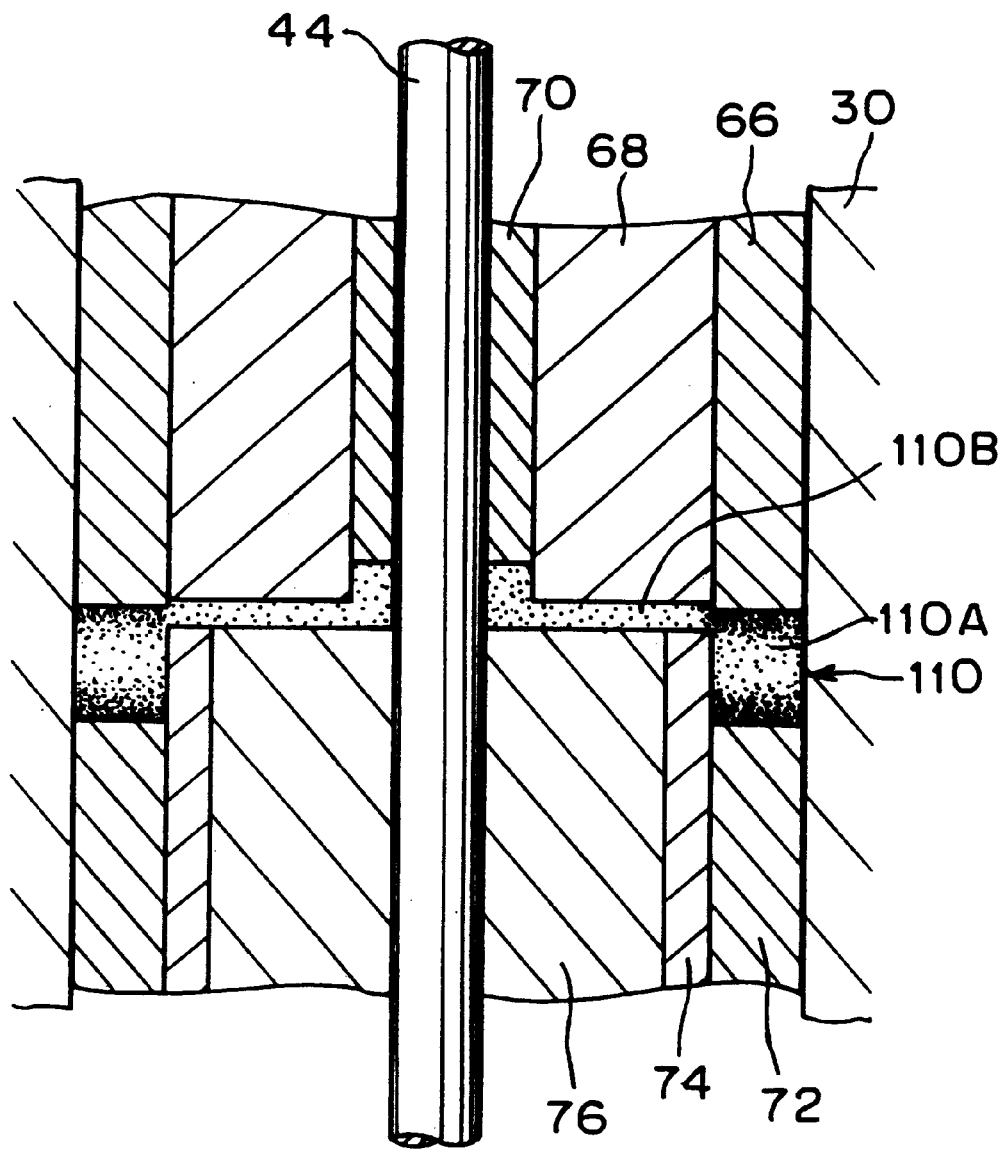
FIG. 14 is a cross section showing an essential part of a device used by a sizing process in an example method of forming the internal gear of this invention.

The molded powder body 26, after being sintered, is subjected to the sizing process by a device of FIG. 14 to finish it to the shape and dimensions with predetermined tolerances.

The sizing device of FIG. 14 has an upper mold which includes a third upper punch 70 fitted over the upper part of the core rod 44, a cylindrical second upper punch 68 having its inner circumferential surface in sliding contact with the outer circumferential surface of the third upper punch 70, and a first upper punch 66 arranged concentric with the core rod 44 between the inner surface of the die body 30 and the outer circumferential surface of the second upper punch 68.

The third upper punch 70 is to press against a part corresponding to the end face of the hub of the disk-shaped portion 110B of the internal gear 110, which is the molded and sintered powder body 26. The second upper punch 68 presses against a part corresponding to the end surface of the disk-shaped portion 110B of the internal gear 110. The first upper punch 66 presses against a part corresponding to the cylindrical portion 110A of the molded internal gear 110.

The first upper punch 66, the second upper punch 68 and the third upper punch 70 are supported by drive mechanisms not shown so that they are movable relative to one another.

A lower mold of the sizing device includes a third lower punch 76 fitted over the lower part of the core rod 44 to face the end faces of the second upper punch 68 and the third upper punch 70; a cylindrical second lower punch 74 having an inner circumferential surface in sliding contact with the outer circumferential surface of the third lower punch 76; and a first lower punch 72 having an inner circumferential surface in sliding contact with the outer circumferential surface of the second lower punch 74.

The third lower punch 76 is to press against a part corresponding to the disk-shaped portion 110B of the internal gear 110 and the inner surface of the hub. The second lower punch 74 has tooth portions that engage with the tooth portions of the cylindrical portion 110A of the internal gear 110. The first lower punch 72 is to press against the free end face of the cylindrical portion 110A of the sintered internal gear 110.

The first lower punch 72, the second lower punch 74 and the third lower punch 76 are supported movable relative to each other.

Using the sizing device of such a construction, the process of sizing the internal gear 110 of the molded powder body 26 is carried out as follows. First, the end faces of the second lower punch 74 and the third lower punch 76 are made flush with each other as shown in FIG. 14 and the end face of the first lower punch 72 is set apart from the end face of the second lower punch 74. In this state, the internal gear 110 is placed on these under punches with its inner surface in contact with the end faces of the under punches and is then loaded into the die body 30.

Next, the end faces of the first upper punch 66, the second upper punch 68 and the third upper punch 70 are placed in contact with parts corresponding to the outer surface of the disk-shaped portion 110B, the end face of the hub and the end face of the cylindrical portion 110A of the internal gear 110 and then pressed with predetermined pressures. This sizing operation corrects various dimensions and produces the internal gear 110 of a precise shape with predetermined tolerances.

Hence, the density distribution of the tooth portions 110a of the cylindrical portion 110A of the completed internal gear 110 is such that the tooth portions 110a have a lower density at their central part than at their ends in the tooth trace direction. That is, because the tooth portions 110a of the internal gear 110 in mesh with the tooth portions of the pinions 116 can be easily displaced along a plane normal to the tooth surfaces, the tooth surfaces of the pinion can be protected against pitting that would otherwise be caused by poor assembly precision of the pinion in the planetary gear train.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An internal gear comprising:
   a boss portion to be mounted coaxially on an outer circumferential surface of a shaft;
   a disk-shaped flange portion extending radially outwardly from the boss portion; and
   a cylindrical gear body integrally connected to an outer circumferential part of the flange portion and having teeth on an inner circumferential surface thereof adapted to be in mesh with a pinion;
wherein all or a part, in a radial direction, of the flange portion has a thickness thereof which progressively increases from an outer diameter side toward an inner diameter side and has a density in the radial direction almost inversely proportional to the thickness.

2. An internal gear as claimed in claim 1, wherein a part of the internal gear which increases in thickness from the outer diameter side toward the inner diameter side is a sintered component formed by a pair of upper and lower molds.

3. A sintered internal gear comprising:

cylindrical gear body having teeth in an inner circumferential surface thereof adapted to be in mesh with a pinion;

a flange portion extending radially inwardly from the cylindrical gear body; and a boss portion provided at an inner diameter portion of the flange portion and mounted on an outer circumferential surface of a shaft;

wherein the cylindrical gear body, the flange portion and the boss portion are formed integrally and sintered, wherein the boss portion protrudes beyond both sides of the flange portion at the inner diameter of the flange portion, and wherein all or a part, in a radial direction, of the flange portion has a thickness thereof which progressively increases from an outer diameter side toward an inner diameter side and has a density in the radial direction almost inversely proportional to the thickness.

4. A sintered internal gear as claimed in claim 3, wherein at least one of the two protruding portions of the boss portion has at least a part in an axial direction thereof which progressively decreases in thickness away from the flange portion.

5. A sintered internal gear as claimed in claim 3, wherein a part in a radial direction of the flange portion is lower in density than other parts.

6. An internal gear comprising:

a disk-shaped portion having an engagement hole to be fitted over a rotating shaft and expanding radially of the rotating shaft; and a cylindrical portion having a tooth portion in an inner circumferential surface thereof and connecting to an outer circumferential part of the disk-shaped portion;

wherein the cylindrical portion has a density distribution such that the density of an almost central part along a tooth trace of the tooth portions is lower than the density of at least one of end parts in the tooth trace direction of each tooth portion.

7. An internal gear as claimed in claim 6, wherein the cylindrical portion is formed of a material having a Young's modulus smaller than the Young's modulus of the material used to make the teeth in mesh with the tooth portion.

8. An internal gear as claimed in claim 6, wherein the disk-shaped portion and the cylindrical portion are formed of a porous material.

9. An internal gear as claimed in claim 6, wherein a part in a radial direction of the disk-shaped portion is lower in density than other parts.

10. An internal gear as claimed in claim 6, wherein all or a part, in a radial direction, of the disk-shaped portion has a thickness thereof which progressively increases from an outer diameter side toward an inner diameter side and has a density in the radial direction almost inversely proportional to the thickness.

11. An internal gear as claimed in claim 6, further including:

a boss portion provided in an inner diameter part of the disk-shaped portion and fitted over an outer circumferential surface of the rotating shaft, the boss portion having protruding portions protruding beyond both sides of the disk-shaped portion at the inner diameter part of the disk-shaped portion.

12. An internal gear as claimed in claim 11, wherein at least one of the protruding portions has at least one part in an axial direction thereof which decreases progressively in thickness away from the disk-shaped portion.

13. An internal gear as claimed in claim 7, wherein the teeth meshing with the tooth portion are a pinion that, in combination with the internal gear, forms a part of a planetary gear.

* * * * *